(12) United States Patent
Yan et al.

(10) Patent No.: US 10,036,150 B2
(45) Date of Patent: Jul. 31, 2018

(54) AUTOMATIC FAUCET

(71) Applicant: Xiamen Forbetter Sanitary Ware Co., Ltd., Xiamen (CN)

(72) Inventors: Xiliang Yan, Xiamen (CN); Yihui Chen, Xiamen (CN); Wenbo Wu, Xiamen (CN)

(73) Assignee: XIAMEN FORBETTER SANITARY WARE CO., LTD., Xiamen, Fujian (CN)

( * ) Notice: Subject to any disclaimer, the term of this patent is extended or adjusted under 35 U.S.C. 154(b) by 0 days.

(21) Appl. No.: 15/494,534

(22) Filed: Apr. 23, 2017

(65) Prior Publication Data

US 2017/0342691 A1 Nov. 30, 2017

(30) Foreign Application Priority Data

May 31, 2016 (CN) .......................... 2016 1 0375767
Jan. 20, 2017 (CN) ..................... 2017 2 0083178 U (51) Int. Cl.

| F16K 11/074 | (2006.01) |
|---|---|
| E03C 1/05 | (2006.01) |
| E03C 1/04 | (2006.01) |
| F16K 31/60 | (2006.01) |
| F16K 31/06 | (2006.01) |
| F16K 47/02 | (2006.01) |
| F16K 11/02 | (2006.01) |

(52) U.S. Cl.
CPC .............. *E03C 1/057* (2013.01); *E03C 1/04* (2013.01); *F16K 11/02* (2013.01); *F16K 31/0675* (2013.01); *F16K 31/605* (2013.01); *F16K 47/023* (2013.01)

(58) Field of Classification Search
USPC .................................................. 137/625.41
See application file for complete search history.

(56) References Cited

U.S. PATENT DOCUMENTS

| 5,167,255 A * | 12/1992 | Gohring ................. E03C 1/057 |
| | | 137/607 |
| 5,309,940 A * | 5/1994 | Delabie ................... E03C 1/057 |
| | | 137/607 |
| 6,854,658 B1 * | 2/2005 | Houghton ........... F16K 11/0746 |
| | | 137/625.41 |
| 8,469,056 B2 * | 6/2013 | Marty .................... F16K 11/087 |
| | | 137/625.4 |
| 8,833,670 B2 * | 9/2014 | Chen .................. G05D 23/1393 |
| | | 137/625.41 |

* cited by examiner

*Primary Examiner* — John Fox
(74) *Attorney, Agent, or Firm* — Leong C. Lei (57) ABSTRACT

An automatic faucet includes a faucet body, an inner core assembly, and a sensor. The inner core assembly includes a valve core, a valve core seat, and a sleeve. The valve core is mounted on the valve core seat. The valve core seat has a cold water hole, a hot water hole, a mixed water hole, and a water outlet. The sleeve is mounted beneath the valve core seat, and has a cold water inlet and a hot water inlet. The sleeve further has a diversion passage communicating with the cold water inlet. The sensor is used to open or close the diversion passage. The sensor includes a sensing module, a solenoid valve, and a buffer rod.

10 Claims, 12 Drawing Sheets

AUTOMATIC FAUCET

BACKGROUND OF THE INVENTION

1. Field of the Invention

The present invention relates to a sanitary product, and more particularly, to an automatic faucet.

2. Description of the Prior Art

An automatic faucet is easy to use and does not cause cross-contamination, having the characteristics of water saving, environmental protection, health, and safety, so it is widely used in hotels, restaurants, stations, hospitals and other public places. A conventional automatic faucet usually has only one sensing passage. When the sensor is ineffective, the faucet cannot be used normally. In general, the automatic faucet has instant-on and instant-off functions by sensing, that is, it cannot meet the need for continuous outflow. Therefore, the automatic faucet is not ideal in use. Accordingly, the present invention intends to provide a dual faucet structure for improving the shortcomings mentioned above.

SUMMARY OF THE INVENTION

The primary object of the present invention is to provide a novel automatic faucet which can be used as an automatic faucet and a general faucet, and has a function of shutting off water when a sensor is ineffective.

In order to achieve the aforesaid object, the automatic faucet of the present invention comprises a faucet body, an inner core assembly, and a sensor. The inner core assembly and the sensor are mounted in the faucet body. The faucet body is formed with a horizontal pipe and a hollow upright pipe. The horizontal pipe includes a discharging passage therein. A discharging end of the horizontal pipe is provided with a water bubbler. The inner core assembly comprises a valve core, a valve core seat, and a sleeve which are assembled in the hollow upright pipe of the faucet body. The valve core is mounted on the valve core seat. The valve core includes a valve stem connected with a faucet handle. A middle portion of the valve core seat is formed with a valve chamber to receive the valve core. A bottom of the valve chamber is formed with a cold water hole, a hot water hole and a mixed water hole in cooperation with the valve core. The valve core seat is further formed with a water outlet. The mixed water hole is in communication with the discharging passage of the faucet body via the water outlet to form a manual control discharging passage. The sleeve is mounted beneath the valve core seat. The sleeve is provided with a cold water inlet and a hot water inlet. The cold water inlet and the hot water inlet correspond to and communicate with the cold water hole and the hot water hole, respectively. The sleeve further has a diversion passage and an opening. The diversion passage is in communication with the cold water inlet. A bottom of the valve core seat is formed with a through hole corresponding to and communicating with the opening of the sleeve. The through hole is in communication with the discharging passage of the faucet body via the water outlet of the valve core seat to form a sensing discharging passage. The sensor comprises a sensing module, a solenoid valve, and a buffer rod. The sensing module is disposed in the faucet body. The solenoid valve and the buffer rod are mounted in the diversion passage of the sleeve. The solenoid valve is electrically connected with the sensing module for receiving a signal from the sensing module and cooperates with the buffer rod to open or close the diversion passage. The sensing module has instant-on and instant-off functions by sensing. The sensing module in a continuous sensing state is able to close and open the solenoid valve.

Preferably, the buffer rod has a central perforation. A lower end of the buffer rod is movably attached to an end face of the solenoid valve. The end face of the solenoid valve is moved up and down to open or close the perforation of the buffer rod.

Preferably, the buffer rod is sleeved with a buffer spring. When the end face of the solenoid valve is moved up, the buffer spring is adapted to reduce an impact force against the buffer rod, preventing a water hammer phenomenon.

Preferably, the sensor further comprises a waterstop structure for closing the sensing discharging passage when the solenoid valve fails. The waterstop structure includes a sealing lever and an adjustment lever. The sealing lever is movably disposed above the buffer rod and located on the through hole of the valve core seat. The sealing lever has a water passage thereon. A lower portion of the sealing lever is provided with a sealing ring for closing the through hole. The adjustment lever includes a rotating portion and a cam portion. The rotating portion is rotatably disposed in a side hole of the valve core seat. The cam portion is eccentrically fixed to an inner end face of the rotating portion. The cam portion has a crescent shape. The cam portion is normally abutted against a top end of the sealing lever so that the sealing ring of the sealing lever is disengaged from the through hole and the through hole is in an open state.

Preferably, the automatic faucet further comprises a control assembly capable of automatically turning off the sensor. The control assembly comprises a rotor and a proximity switch. The rotor is mounted in the sleeve corresponding in position to the hot water inlet. The proximity switch is electrically connected with the sensing module of the sensor.

Preferably, the rotor is a magnetic rotor, and the proximity switch is a Hall element.

Preferably, a check valve is provided in the diversion passage.

Preferably, the faucet body is provided with a sensing window corresponding to the sensing module.

Preferably, the sensing module is a touch sensing module or an infrared sensing module.

Preferably, a bottom of the hollow upright pipe of the faucet body is connected with an extension pipe.

The present invention has the following advantages:
1. When the sensor of the present invention is actuated, the faucet is capable of flowing out cold water only. The faucet handle can be operated to drive the valve core like a common faucet to flow out cold water, hot water and mixed water, so it can be used more convenient and more user-friendly.
2. In addition to the instant-on and instant-off functions, the sensor in a continuous sensing state is capable of closing and opening the solenoid valve to meet some special needs for use.
3. The buffer rod of the sensor of the present invention is sleeved with the buffer spring. When the end face of the solenoid valve is moved up to seal the perforation of the buffer rod, the buffer spring is adapted to reduce the impact force against the buffer rod, preventing a water hammer phenomenon.
4. Further, the sensor of the present invention further includes the waterstop structure. When the solenoid valve malfunctions, the sensing discharging passage can be closed manually to avoid the waste of the water supply.

5. The automatic faucet of the present invention further comprises the control assembly which is capable of automatically turning off the sensor. The control assembly consists of the rotor and the proximity switch. When the manual control discharging passage is opened and the hot water inlet of the sleeve is opened, the control assembly automatically turns off the sensor

DETAILED DESCRIPTION OF THE PREFERRED EMBODIMENTS

Embodiments of the present invention will now be described, by way of example only, with reference to the accompanying drawings.

As shown in FIG. 1 to FIG. 12, the present invention relates to an automatic faucet. The automatic faucet comprises a faucet body 1, an inner core assembly and a sensor 5. The inner core assembly and the sensor 5 are mounted in the faucet body 1. The faucet body 1 is formed with a horizontal pipe 11 and a hollow upright pipe 12. The horizontal pipe 11 includes a discharging passage 13 therein. A front end of the horizontal pipe 11 is provided with a water bubbler 14, which is the existing technology. The inner core assembly mainly comprises a valve core 2, a valve core seat 3, and a sleeve 4 which are assembled and arranged in the hollow upright pipe 12 of the faucet body 1. The valve core 2 is mounted on the valve core seat 3. The valve core 2 includes a valve stein 21 on the top of the valve core 2. The valve stein 21 extends out of the valve core seat 3 and is connected with a faucet handle 6. A middle portion of the valve core seat 3 is formed with a valve chamber 31 having an open top to receive the valve core 2. The bottom of the valve chamber 31 is formed with a cold water hole 32, a hot water hole 33 and a mixed water hole 34 in cooperation with the valve core 2. The valve core seat 3 is further formed with a water outlet 35. The mixed water hole 34 is in communication with the discharging passage 13 of the faucet body 1 via the water outlet 35 to form a manual control discharging passage. The sleeve 4 is mounted beneath the valve core seat 3. The sleeve 4 is provided with a cold water inlet 41 and a hot water inlet 42. The cold water inlet 41 and the hot water inlet 42 correspond to and communicate with the cold water hole 32 and the hot water hole 33, respectively. In particular, the sleeve 4 is provided with a diversion passage 43 and an opening 44. The diversion passage 43 is in communication with the cold water inlet 41. The bottom of the valve core seat 3 is formed with a through hole 36 corresponding to and communicating with the opening 44 of the sleeve 4. The through hole 36 is in communication with the water outlet 35 of the valve core seat 3. The cold water flows through the diversion passage 43 and the opening 44 communicated with the through hole 36 of the valve core seat 3 and through the water outlet 35 of the valve core seat 3 to communicate with the discharging passage 13 of the faucet body 1 to form a sensing discharging passage.

The sensor 5 controls the sensing discharging passage to be opened or closed. The sensor 5 comprises a sensing module 51, a solenoid valve 52, a buffer rod 53, and a buffer spring 54. The sensing module 51 is disposed in the faucet body 1. The solenoid valve 52 and the buffer rod 53 are mounted in the diversion passage 43 of the sleeve 4. The solenoid valve 52 is electrically connected with the sensing module 51 for receiving a signal from the sensing module 51 and cooperates with the buffer rod 53 to open or close the diversion passage 43. The buffer rod 53 has a central perforation 531. A lower end of the buffer rod 53 is movably attached to an end face of the solenoid valve 52. The end face of the solenoid valve 52 is moved up and down to open or close the perforation 531 of the buffer rod 53. The buffer spring 54 is fitted on the buffer rod 53. When the end face of the solenoid valve 52 is moved up to seal the perforation 531 of the buffer rod 53, the buffer spring 54 is adapted to reduce the impact force against the buffer rod 53, preventing a water hammer phenomenon. The sensing module 51 of the present invention may be a touch sensing module or an infrared sensing module. The faucet body 1 is provided with a sensing window 15 corresponding to the sensing module 51. The sensing module 51 and the sensing window 15 may be disposed on the hollow upright pipe 12 of the faucet body 1. The sensing module 51 of the present invention has instant-on and instant-off functions by sensing. The sensing module 51 in a continuous sensing state has the function of closing and opening the solenoid valve 52. The continuous sensing time of the sensing module 51 and the closed time of the solenoid valve 52 can be set according to actual needs. In this embodiment, it is preferable that the sensing module 51 continuously senses for about 5 seconds and the solenoid valve 52 is closed for 3 minutes. When the set time of closing the solenoid valve 52 is up, the sensing function is automatically restored or the sensing module 51 continuously senses to start the function of the solenoid valve 52.

Figure 9:
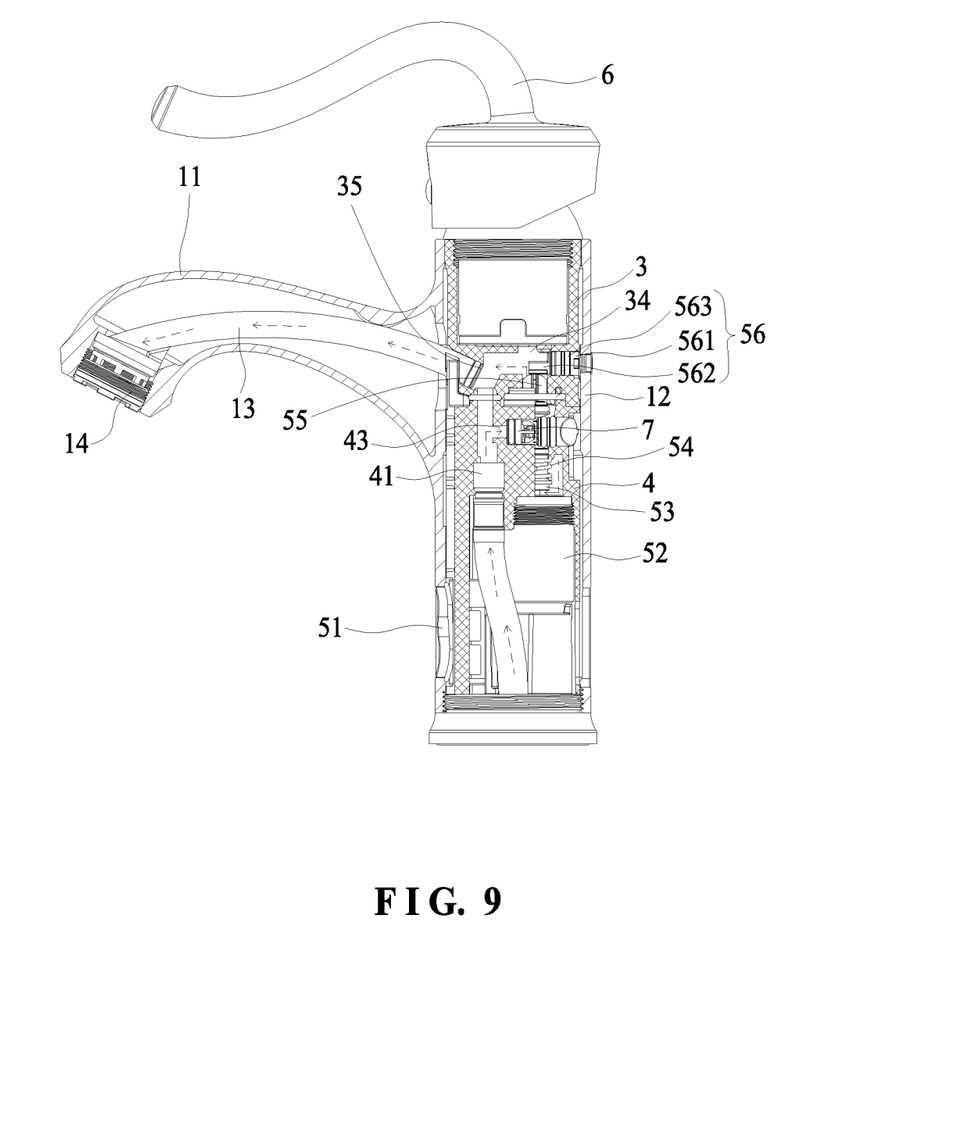
FIG. 9 is a schematic view of the present invention in a sensing discharging state.

When in use, a first implementation of the present invention is shown in FIG. 9 and the direction of the water flow is indicated by the arrows in FIG. 9. When the valve core 2 is closed, the sensor is actuated and the cold water passes through the cold water inlet 41 of the sleeve 4 into the diversion passage 43 and then flows out from the discharging passage 13 of the faucet body 1 through the water outlet 35 of the valve core seat 3. This is in a sensing discharging state.

Figure 10:
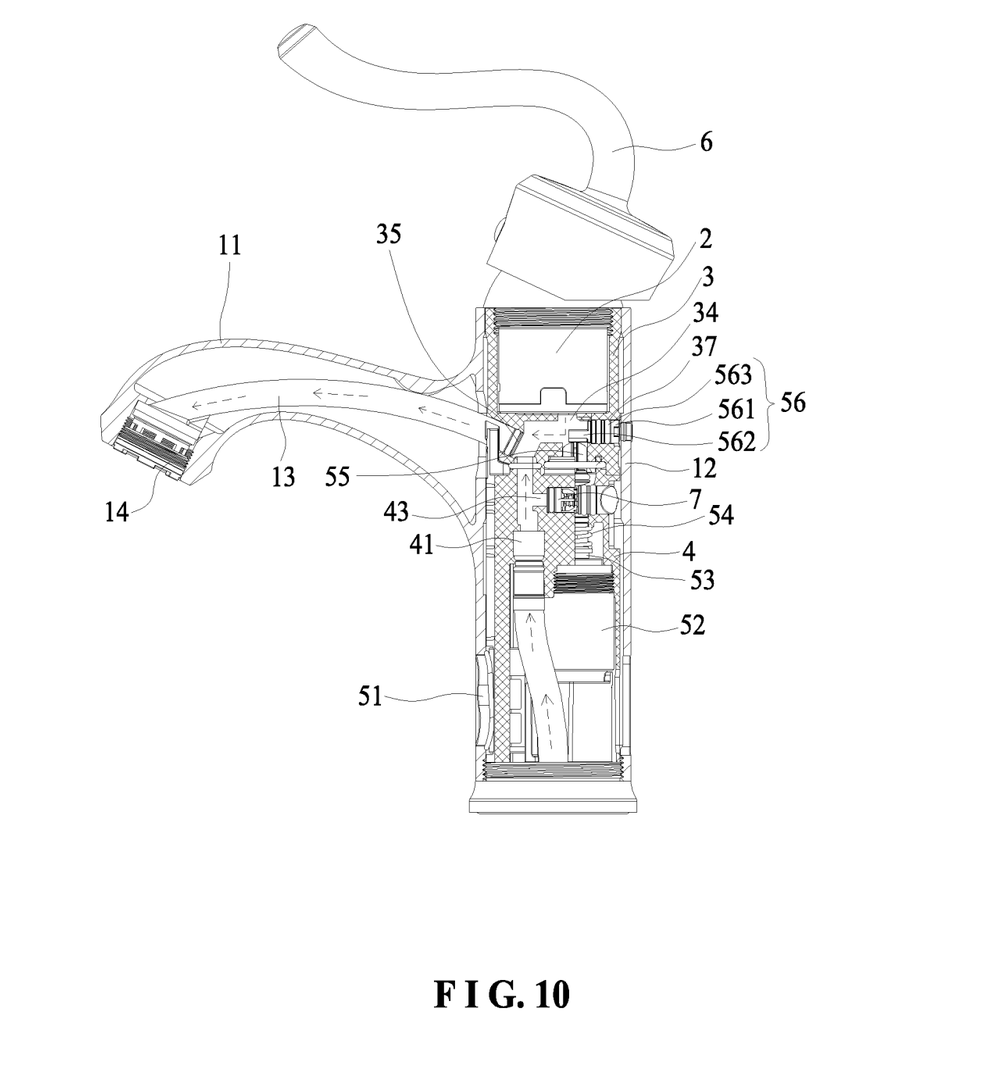
FIG. 10 is a schematic view of the present invention in a manual control discharging state.
Figure 11:
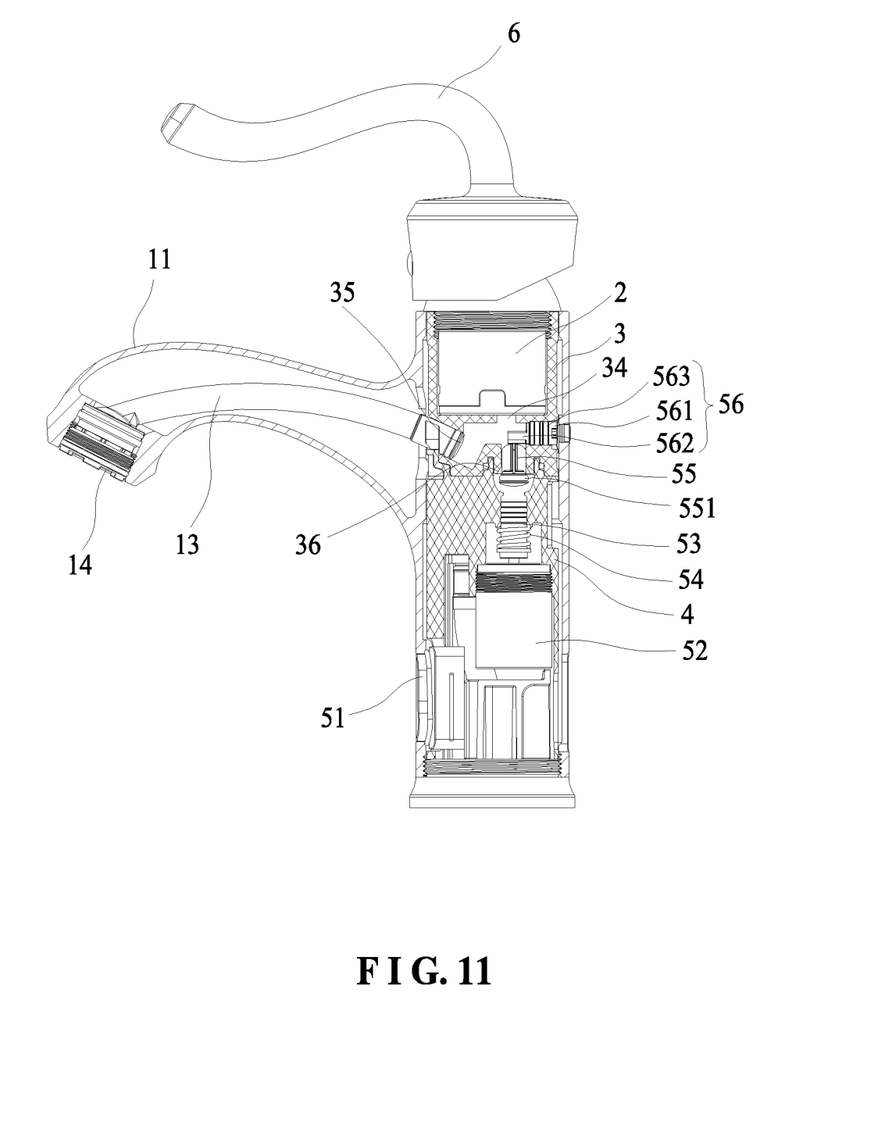
FIG. 11 is a sectional view of the present invention, showing that the sensor is ineffective.

A second implementation of the present invention is shown in FIG. 10 and the direction of the water flow is indicated by the arrows in FIG. 10. The faucet handle 6 is operated by the user to open the valve core 2, and the water passes through the cold and hot water inlets 41, 42 of the sleeve 4 and the hot and cold water holes 32, 33 of the valve core seat 3 to the valve core 2, and the water is mixed to pass through the mixed water hole 34 to the water outlet 35, and flows out from the discharging passage 13 of the faucet body 1 through the water outlet 35. This is in a manual control discharging state.

Figure 1:
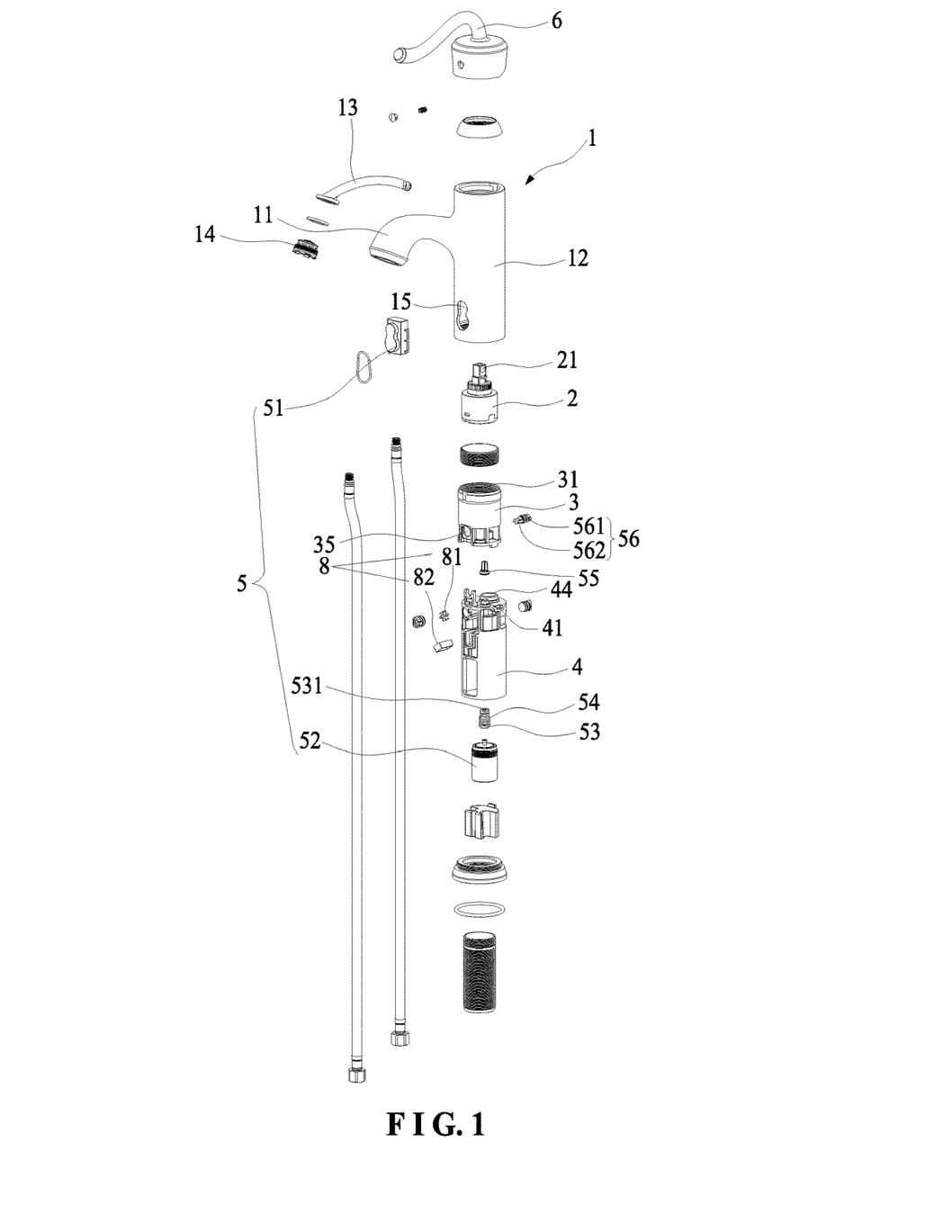
FIG. 1 is an exploded view of the present invention.
Figure 2:
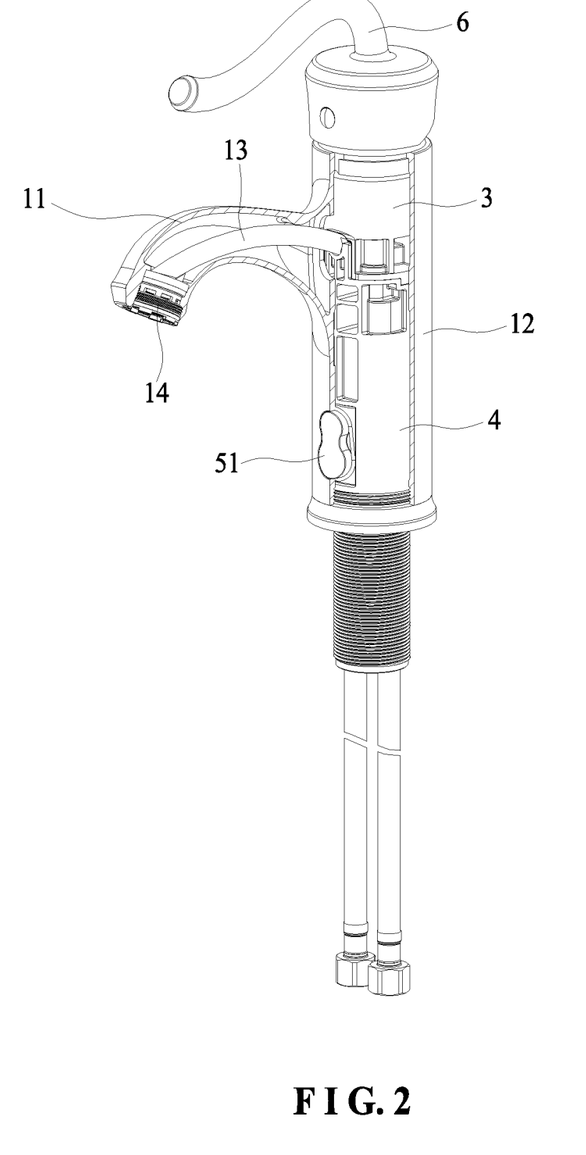
FIG. 2 is a partial sectional view of the present invention.
Figure 3:
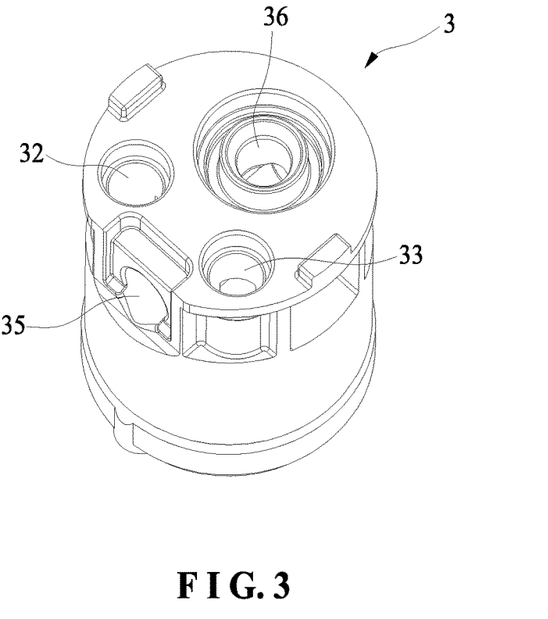
FIG. 3 is a perspective view of the valve core seat of the present invention.
Figure 4:
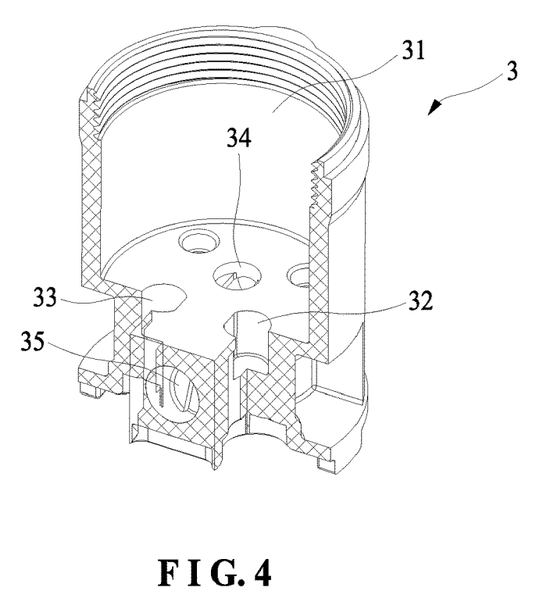
FIG. 4 is a perspective sectional view of the valve core seat of the present invention.
Figure 5:
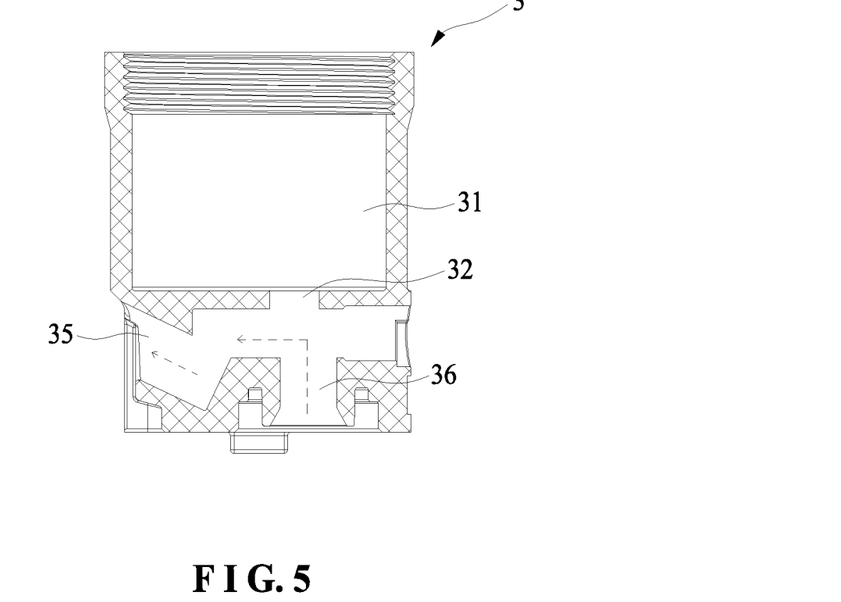
FIG. 5 is a sectional view of the valve core seat of the present invention.
Figure 6:
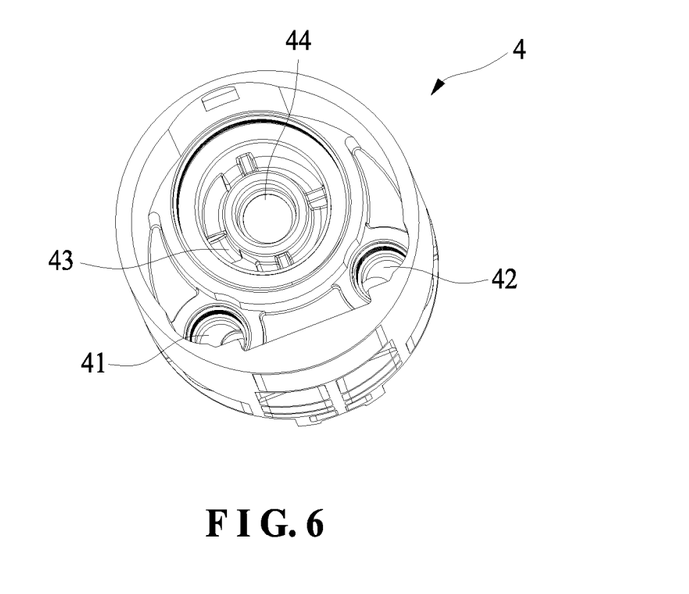
FIG. 6 is a perspective view of the sleeve of the present invention.
Figure 7:
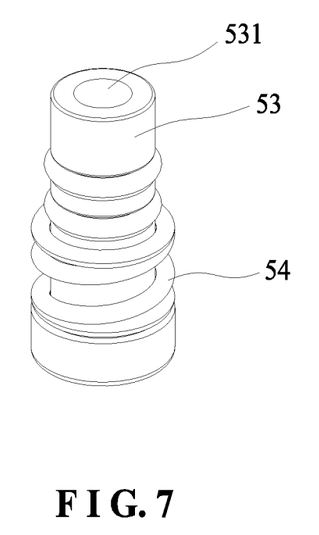
FIG. 7 is a perspective view of the buffer rod of the present invention.
Figure 8:
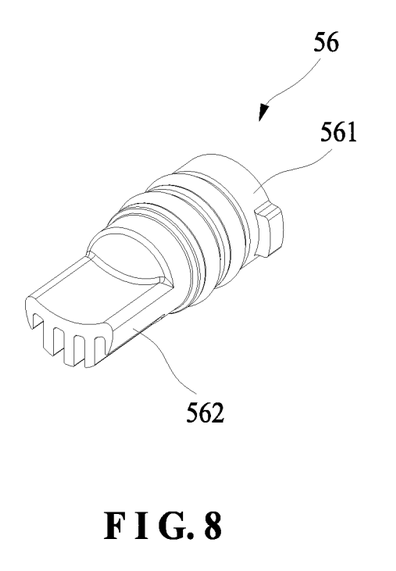
FIG. 8 is a perspective view of the adjustment lever of the waterstop structure of the present invention.
Figure 12:
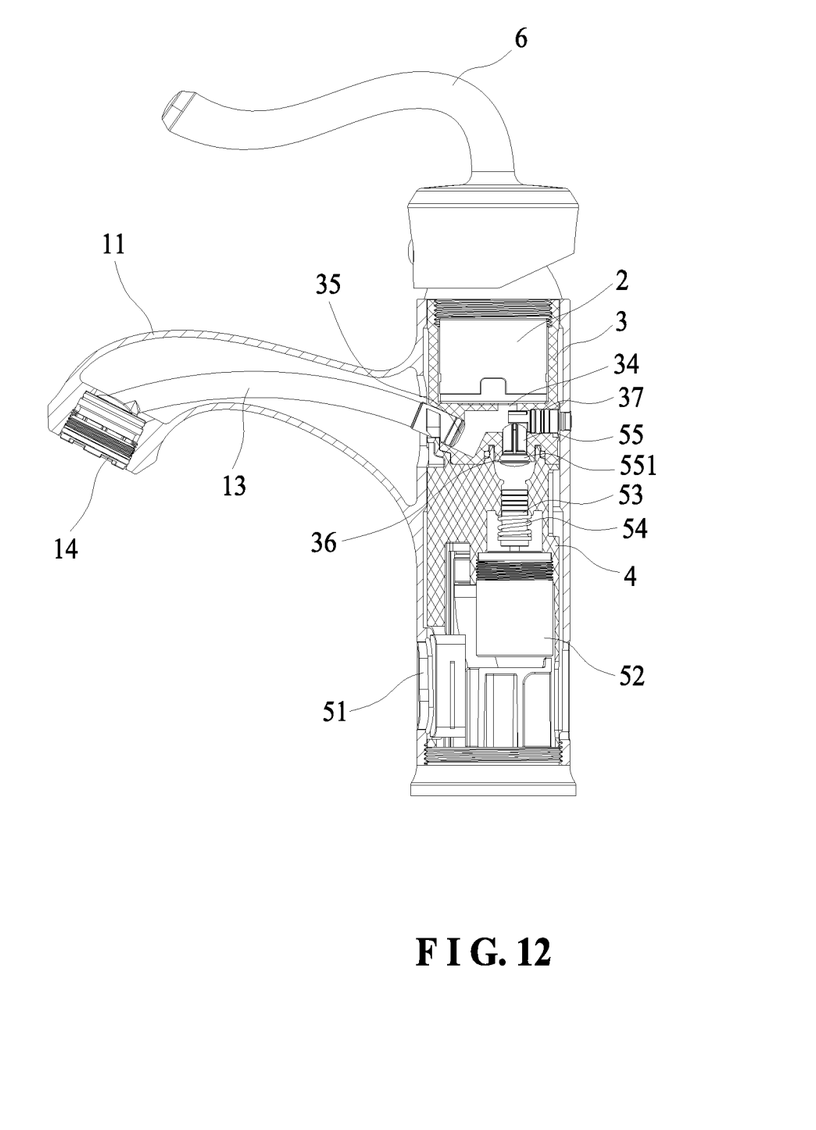
FIG. 12 is a sectional view of the present invention, showing that the sensor is ineffective and the water supply is stopped.

Further, the sensor 5 further comprises a waterstop structure for manually closing the sensing discharging passage when the solenoid valve 52 fails. The waterstop structure is composed of a sealing lever 55 and an adjustment lever 56. The sealing lever 55 is movably disposed above the buffer rod 53 and located on the through hole 36 of the valve core seat 3. The sealing lever 55 has a water passage thereon. A lower portion of the sealing lever 55 is provided with a sealing ring 551 for closing the through hole 36. The adjustment lever 56 includes a rotating portion 561 and a cam portion 562. The rotating portion 561 is sleeved with a sealing ring 563 and rotatably disposed in a side hole 37 of the valve core seat 3. The cam portion 562 is eccentrically fixed to an inner end face of the rotating portion 561. The cam portion 562 has a crescent shape. The cam portion 562 is normally abutted against a top end of the sealing lever 55. The sealing lever 55 is at the lower position so that the sealing ring 551 of the sealing lever 55 is disengaged from the through hole 36, i.e., the through hole 36 is in an open state (referring to FIG. 11). When the solenoid valve 52 the sensor 5 fails, the cold water passes through the cold water inlet 41 and the diversion passage 43 of the sleeve 4, the opening 44, the through hole 36 of the valve core seat 3, and the water outlet 35 of the valve core seat 3, and then flows out from the discharging passage 13 of the faucet body 1 to cause the waste of the water supply. At this time, applying an external force rotates the rotating portion 561 of the adjustment lever 56 of the waterstop structure, so that the cam portion 562 of the adjustment lever 56 is disengaged from the sealing lever 55, and the sealing lever 55 is moved up by the action of water pressure, and the sealing ring 551 of the sealing lever 55 is to close the through hole 36 so as to block the sensing discharging passage, as shown in FIG. 12.

Figure 13:
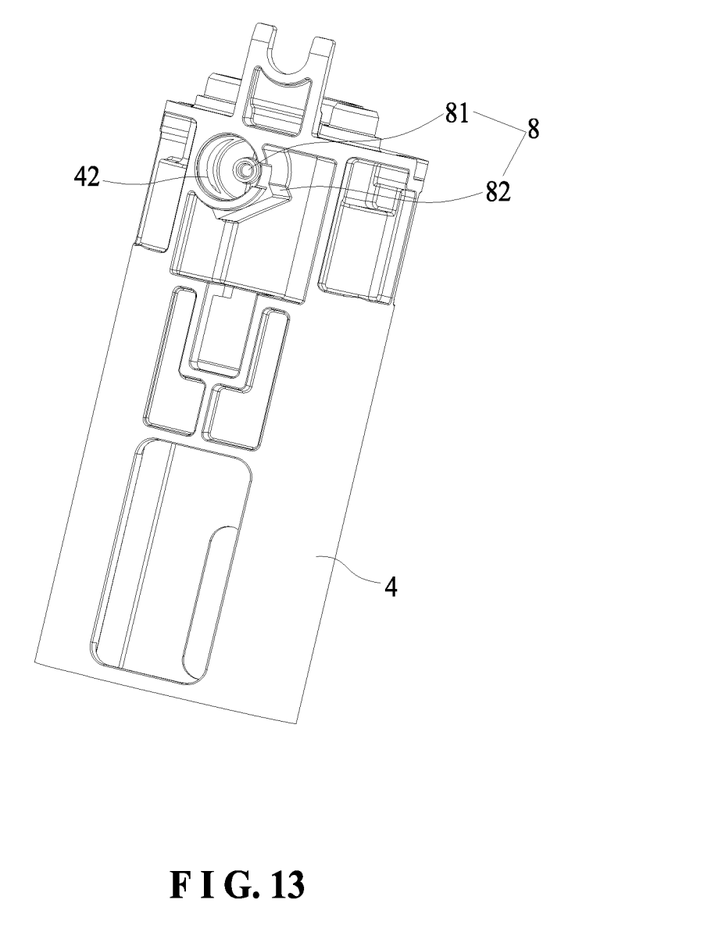
FIG. 13 is a partial schematic view of the present invention provided with the control assembly.
Figure 14:
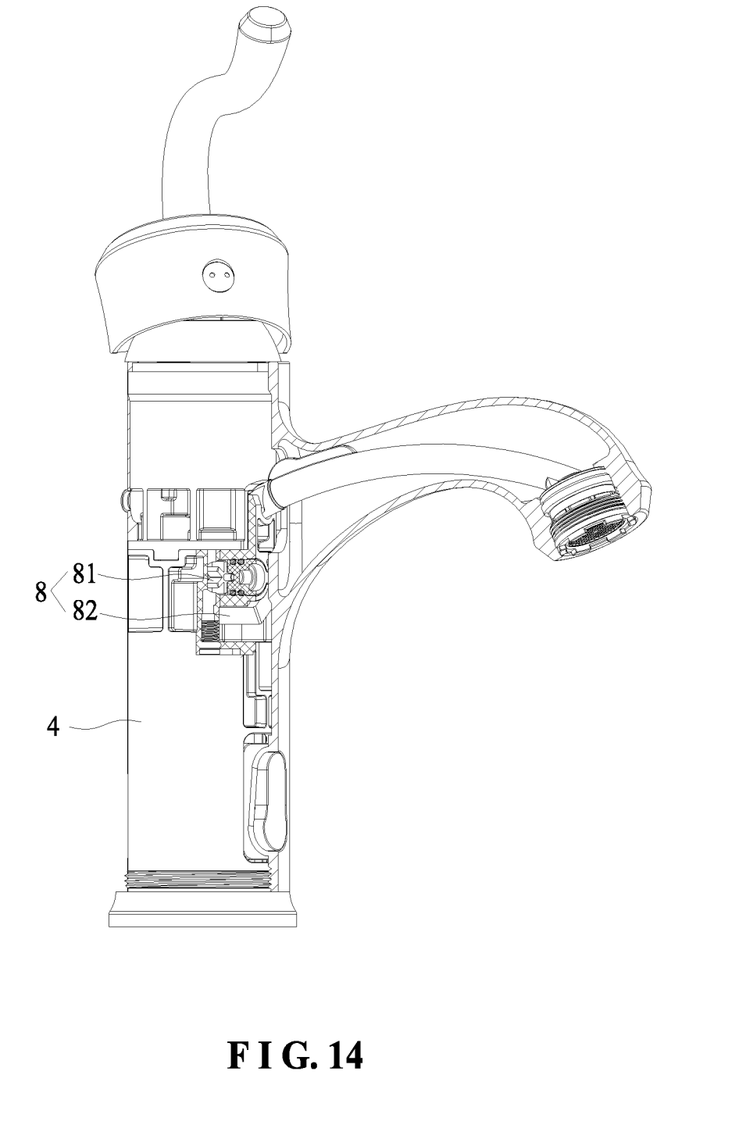
FIG. 14 is a partial sectional view of the faucet of the present invention provided with the control assembly.

Furthermore, the automatic faucet of the present invention further comprises a control assembly 8 capable of automatically turning off the sensor 5. As shown in FIG. 13 and FIG. 14, the control assembly 8 comprises a rotor 81 and a proximity switch 82. The rotor 81 may be a magnetic rotor. The proximity switch 82 may be a Hall element 81. The rotor 81 is mounted in the sleeve 4 corresponding in position to the hot water inlet 42. The proximity switch 82 is disposed in the faucet body 1 and electrically connected with the sensing module 51 of the sensor 5. The working principle is that when the manual control discharging passage is opened and the hot water inlet 42 of the sleeve 4 is opened, the rotor 81 generates a magnetic field, and the proximity switch 82 inducts the magnetic field and transmits the signal to the sensing module 51 to close the solenoid valve 52, such that the sensor 5 is deactivated to ensure that the temperature of the hot water is not affected by the sensing discharging passage when the manual control discharging passage is opened. In particular, the control assembly 8 functions only when the hot water inlet 42 is opened. The control unit 8 is ineffective when the manual control discharging passage is opened to flow out cold water.

Further, a check valve 7 is provided in the diversion passage 43 of the present invention.

Figure 15:
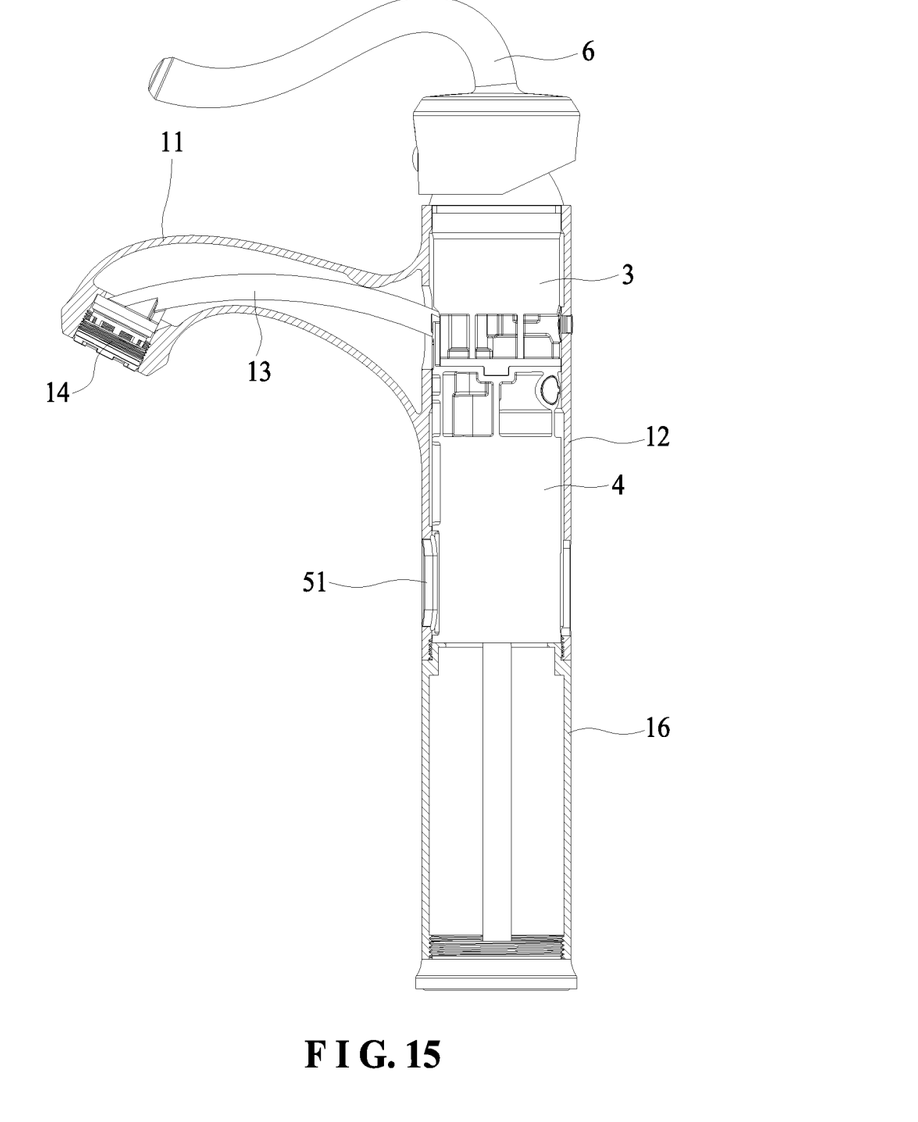
FIG. 15 is a sectional view of the present invention, showing that the bottom of the faucet is connected with an extension pipe.

Further, the bottom of the hollow upright pipe 12 of the faucet body 1 of the present invention may be connected with an extension pipe 16 through screw threads for increasing the height of the faucet body 1 so that it can be mounted on a pedestal basin, as shown in FIG. 15.

As can be seen from the above, when the sensor of the present invention is actuated, the faucet is capable of flowing out cold water only. The faucet handle can be operated to drive the valve core like a common faucet to flow out cold water, hot water and mixed water, so it can be used more convenient and more user-friendly. In addition to the instant-on and instant-off functions, the sensor in a continuous sensing state has the function of closing and opening the solenoid valve to meet some special needs for use. Further, the sensor of the present invention further includes the waterstop structure. When the solenoid valve malfunctions, the sensing discharging passage can be closed manually by means of the waterstop structure to avoid the waste of the water supply. In addition, the automatic faucet of the present invention further comprises the control assembly which is capable of automatically turning off the sensor. The control assembly consists of the rotor and the proximity switch. When the manual control discharging passage is opened and the hot water inlet of the sleeve is opened, the control assembly automatically turns off the sensor Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. An automatic faucet, comprising a faucet body, an inner core assembly, and a sensor, the inner core assembly and the sensor being mounted in the faucet body; the faucet body being formed with a horizontal pipe and a hollow upright pipe, the horizontal pipe including a discharging passage therein, a discharging end of the horizontal pipe being provided with a water bubbler, characterized by: the inner core assembly comprising a valve core, a valve core seat, and a sleeve which are assembled in the hollow upright pipe of the faucet body, the valve core being mounted on the valve core seat, the valve core including a valve stein connected with a faucet handle, a middle portion of the valve core seat being formed with a valve chamber to receive the valve core, a bottom of the valve chamber being formed with a cold water hole, a hot water hole and a mixed water hole in cooperation with the valve core, the valve core seat being further formed with a water outlet, the mixed water hole being in communication with the discharging passage of the faucet body via the water outlet to form a manual control discharging passage; the sleeve being mounted beneath the valve core seat, the sleeve being provided with a cold water inlet and a hot water inlet, the cold water inlet and the hot water inlet corresponding to and communicating with the cold water hole and the hot water hole respectively, the sleeve further having a diversion passage and an opening, the diversion passage being in communication with the cold water inlet, a bottom of the valve core seat being formed with a through hole corresponding to and communicating with the opening of the sleeve, the through hole being in communication with the discharging passage of the faucet body via the water outlet of the valve core seat to form a sensing discharging passage; the sensor comprising a sensing module, a solenoid valve, and a buffer rod, the sensing module being disposed in the faucet body, the solenoid valve and the buffer rod being mounted in the diversion passage of the sleeve, the solenoid valve being electrically connected with the sensing module for receiving a signal from the sensing module and cooperating with the buffer rod to open or close the diversion passage, the sensing module having instant-on and instant-off functions by sensing, the sensing module in a continuous sensing state being able to close and open the solenoid valve.

2. The automatic faucet as claimed in claim 1, wherein the buffer rod has a central perforation, a lower end of the buffer rod is movably attached to an end face of the solenoid valve, and the end face of the solenoid valve is moved up and down to open or close the perforation of the buffer rod.

3. The automatic faucet as claimed in claim 2, wherein the buffer rod is sleeved with a buffer spring, when the end face of the solenoid valve is moved up, the buffer spring is adapted to reduce an impact force against the buffer rod, preventing a water hammer phenomenon.

4. The automatic faucet as claimed in claim 1, wherein the sensor further comprises a waterstop structure for closing the sensing discharging passage when the solenoid valve fails, the waterstop structure includes a sealing lever and an adjustment lever, the sealing lever is movably disposed above the buffer rod and located on the through hole of the valve core seat, the sealing lever has a water passage thereon, a lower portion of the sealing lever is provided with a sealing ring for closing the through hole, the adjustment lever includes a rotating portion and a cam portion, the rotating portion is rotatably disposed in a side hole of the valve core seat, the cam portion is eccentrically fixed to an inner end face of the rotating portion, the cam portion has a crescent shape, the cam portion is normally abutted against a top end of the sealing lever so that the sealing ring of the sealing lever is disengaged from the through hole and the through hole is in an open state.

5. The automatic faucet as claimed in claim 1, further comprising a control assembly capable of automatically turning off the sensor, the control assembly comprising a rotor and a proximity switch, the rotor being mounted in the sleeve corresponding in position to the hot water inlet, the proximity switch being electrically connected with the sensing module of the sensor.

6. The automatic faucet as claimed in claim 5, wherein the rotor is a magnetic rotor, and the proximity switch is a Hall element.

7. The automatic faucet as claimed in claim 1, wherein a check valve is provided in the diversion passage.

8. The automatic faucet as claimed in claim 1, wherein the faucet body is provided with a sensing window corresponding to the sensing module.

9. The automatic faucet as claimed in claim 1, wherein the sensing module is one of a touch sensing module and an infrared sensing module.

10. The automatic faucet as claimed in claim 1, wherein a bottom of the hollow upright pipe of the faucet body is connected with an extension pipe.

\* \* \* \* \*